US010528690B2

(12) United States Patent
Chou

(10) Patent No.: US 10,528,690 B2
(45) Date of Patent: Jan. 7, 2020

(54) POWER COMPUTATION LOGIC

(71) Applicant: Synopsys, Inc., Mountain View, CA (US)

(72) Inventor: Ching-Ping Chou, Saratoga, CA (US)

(73) Assignee: Synopsys, Inc., Mountain View, CA (US)

(*) Notice: Subject to any disclaimer, the term of this patent is extended or adjusted under 35 U.S.C. 154(b) by 43 days.

(21) Appl. No.: 15/798,832

(22) Filed: Oct. 31, 2017

(65) Prior Publication Data

US 2018/0121573 A1 May 3, 2018

Related U.S. Application Data

(60) Provisional application No. 62/415,480, filed on Oct. 31, 2016.

(51) Int. Cl.
*G06F 17/50* (2006.01)
(52) U.S. Cl.
CPC ........ *G06F 17/504* (2013.01); *G06F 17/5027* (2013.01); *G06F 2217/78* (2013.01); *Y02D 10/45* (2018.01)
(58) Field of Classification Search
CPC ............. G06F 2217/78; G06F 17/5022; G06F 1/3203; G06F 1/3243; G06F 17/5045; G06F 1/26; G06F 11/3062; G06F 17/5027; G06F 17/504; G06F 2201/81; G06F 9/3001
USPC .................................. 716/103, 109, 132–133
See application file for complete search history.

(56) References Cited

U.S. PATENT DOCUMENTS

| | | | |
|---|---|---|---|
| 7,134,100 B2 | 11/2006 | Ravi et al. | |
| 7,231,621 B1 | 6/2007 | Herron et al. | |
| 8,074,195 B2 | 12/2011 | Melamed-Kohen et al. | |
| 8,201,121 B1 | 6/2012 | Sankaralingam et al. | |
| 8,453,086 B2 | 5/2013 | Tung et al. | |
| 8,600,722 B1 | 12/2013 | Chan et al. | |
| 9,529,946 B1 * | 12/2016 | Schumacher | ....... G06F 17/5022 |
| 2006/0058994 A1 * | 3/2006 | Ravi | ................... G06F 17/5022 703/23 |
| 2006/0277509 A1 | 12/2006 | Tung et al. | |
| 2009/0271167 A1 | 10/2009 | Zhu et al. | |

OTHER PUBLICATIONS

WIPO Application No. PCT/US2017/059092, PCT International Search Report and Written Opinion of the International Searching Authority dated Jan. 8, 2018.
WIPO Application No. PCT/US2017/059092, PCT International Preliminary Report on Patentability dated May 9, 2019.

* cited by examiner

Primary Examiner — Nghia M Doan
(74) Attorney, Agent, or Firm — Alston & Bird LLP

(57) ABSTRACT

A computer-aided method for configuring a hardware verification system is presented. The method includes receiving, by the computer, a first data representative of a first design of an integrated circuit, when the computer is invoked to configure the verification system, and transforming, using the computer, the first data into a second data representative of a second design. The second design includes a functionality of the first design, and a first circuit adapted to compute a third data representative of a power consumption of a first portion of the first design when the hardware verification system is configured with the second data and run. The first circuit is programmable without reconfiguring the second design.

48 Claims, 10 Drawing Sheets

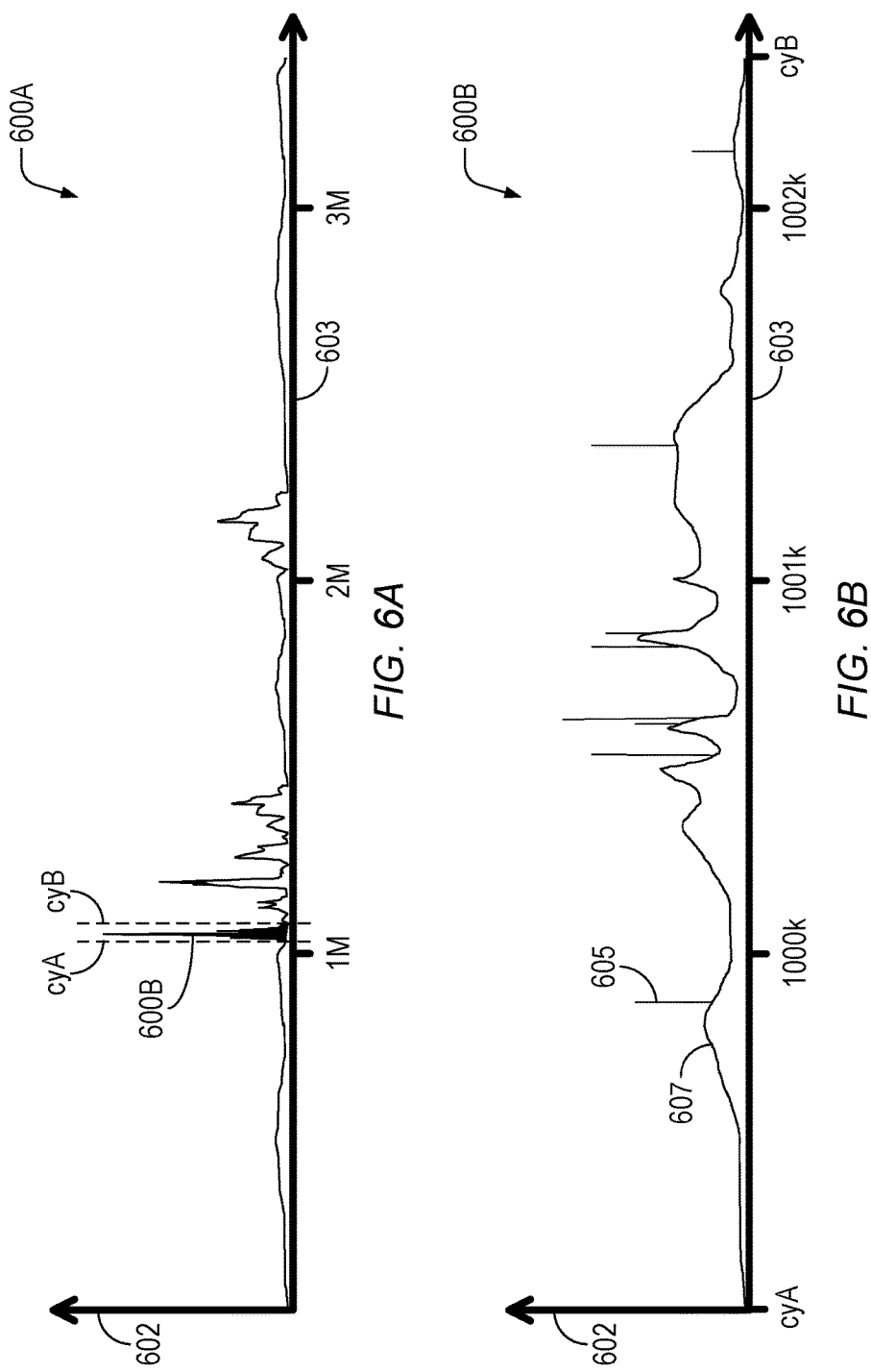

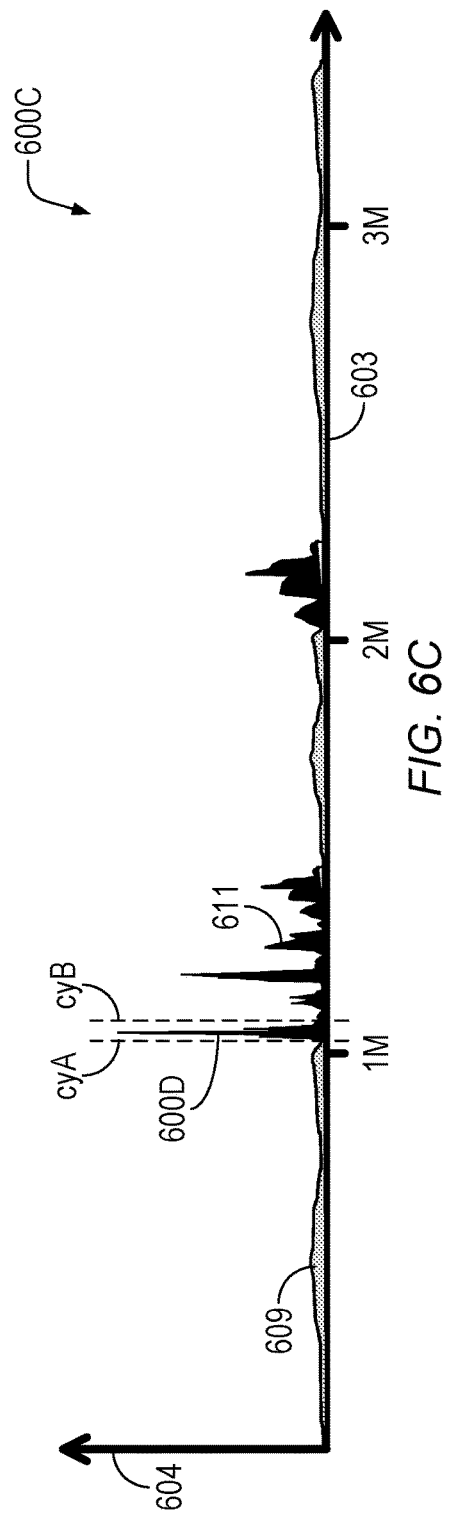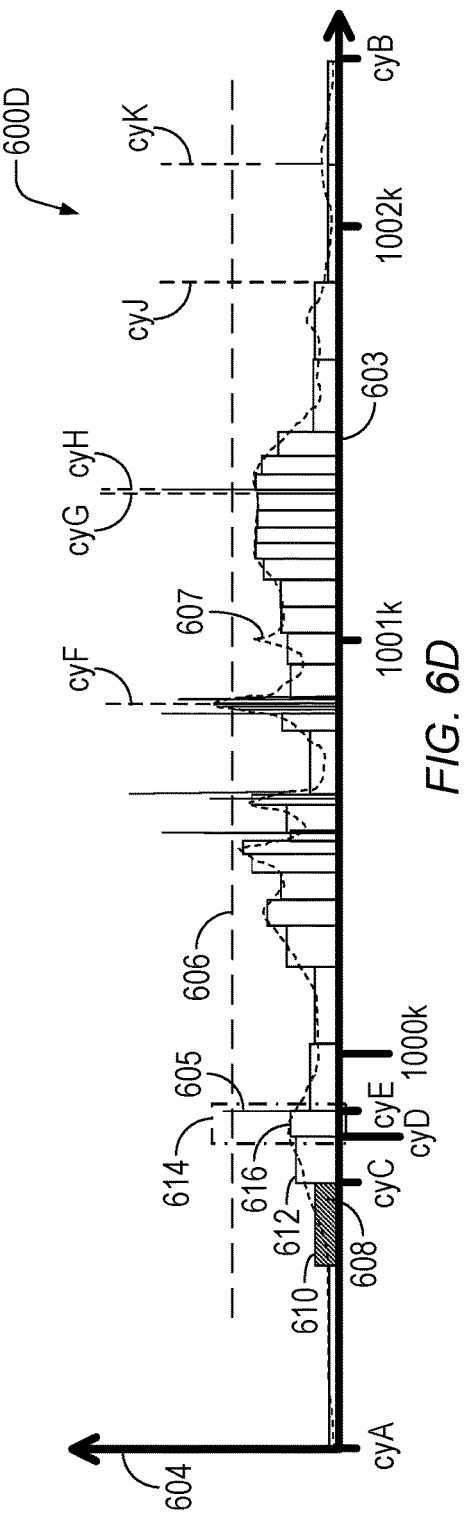

POWER COMPUTATION LOGIC

CROSS-REFERENCES TO RELATED APPLICATIONS

This application claims priority, under 35 U.S.C. § 119(e), from U.S. Provisional Application No. 62/415,480, filed on Oct. 31, 2016, entitled "POWER COMPUTATION LOGIC", the contents of all of which is incorporated herein by reference in its entirety.

BACKGROUND

The present disclosure relates generally to computer aided testing of a circuit design, and more specifically to improving the performance of modeling a power consumption of the circuit design.

Integrated circuit (IC) designers commonly describe their designs in hardware description language (HDL) such as Verilog, VHDL, SystemC, and the like. In IC design, hardware emulation may refer to the process of replicating behavior of one or more pieces of hardware such as an initial circuit design, hereinafter also referred to as a design under test (DUT), with another piece of hardware, such as a special-purpose emulation system. An emulation model is usually generated in accordance with an HDL source code representing the design under test. The emulation model is compiled into a format used to program the emulation system that may include one or more field programmable gate array (FPGA). Thereby, the DUT is mapped by the compiler into the FPGA(s) of the emulation system. Running the emulation system as programmed with the emulation model enables debugging and functional verification of the DUT. Overall progress of the emulation is usually controlled by a master clock signal generated on the emulator hardware, which enables the emulation model to run on the emulation hardware at much higher speed than when simulating the DUT entirely in software. A DUT, such as for example an application specific IC (ASIC), may include a huge number of signals that makes simulating the DUT a challenge.

Currently, the power and current consumption profiling of a DUT is typically performed by extracting the waveforms of huge quantities of design signals from the simulation or emulation, then applying more software tools to compute the powers and currents based on the waveform data, which is time consuming and resource intensive. As a result, there may be poor coverage over long simulation cycles or corner cases within the constraints imposed by time-to-market. The resulting power design errors may incur high costs to redesign, re-manufacture, and/or recall and replace the products.

With recent technology advances, circuit designs include ever greater numbers of signals. Therefore, there is a need for accurately modeling the power consumption of a DUT, while reducing the amount of computer resources needed to perform the power consumption modeling.

SUMMARY

According to one embodiment of the present invention, a computer-aided method for configuring a hardware verification system is presented. The method includes receiving, by the computer, a first data representative of a first design of an integrated circuit, when the computer is invoked to configure the verification system, and transforming, using the computer, the first data into a second data representative of a second design. The second design includes a functionality of the first design, and a first circuit adapted to compute a third data representative of a power consumption of a first portion of the first design when the hardware verification system is configured with the second data and run. The first circuit is programmable without reconfiguring the second design.

According to one embodiment, the first circuit is programmable to select the first portion when the hardware verification system is run. According to one embodiment, the first circuit is programmable to select a second portion of the first design, and compute a fourth data representative of a power consumption of the second portion of the first design when the hardware verification system is run.

According to one embodiment, the first circuit transmits the third data when the third data is equal to or larger than a predetermined threshold. According to one embodiment, the third data is received intermittently by a software module that accumulates the third data during a multitude of cycles of the hardware verification system.

According to one embodiment, the first circuit computes the third data during one cycle of the hardware verification system. According to one embodiment, the method further includes identifying, using the first circuit, a first number of transitions of a first signal of the first portion, and multiplying, using the first circuit, the first number by a fourth data indicative of a power consumption associated with the first signal to form a first weighted count when the hardware verification system is run.

According to one embodiment, the method further includes identifying, using the first circuit, a second number of transitions of a second signal of the first portion. The method further includes multiplying, using the first circuit, the second number of transitions of the second signal by a fifth data indicative of a power consumption associated with the second signal to form a second weighted count. The method further includes adding, using the first circuit, the first weighted count and the second weighted count to determine the third data.

According to one embodiment, the method further comprising adding, using the first circuit, a first value of the third data during one cycle of the hardware verification system and a second value of the third data during another cycle of the hardware verification system to form an accumulated third data. According to one embodiment, the method further comprising transmitting, using the first circuit, the accumulated third data when the accumulated third data is equal to or larger than a predetermined threshold.

According to one embodiment, the second data further includes a second circuit adapted to compute a fourth data representative of a power consumption of a second portion of the first design different from the first portion, and a third circuit adapted to compute a sum of the third data and the fourth data when the hardware verification system is run. According to one embodiment, the second data further includes a second circuit adapted to compute a fourth data representative of a power consumption of a second portion of the first design different from the first portion. The method further includes programming the first circuit and the second circuit to compute the third data and the fourth data such that a portion of the computation occurs during a same multitude of emulation cycles. According to one embodiment, the first portion and the second portion each include a first signal.

According to one embodiment, the second data further includes a second circuit adapted to compute a fourth data representative of a power consumption of a second portion of the first design different from the first portion. The method further includes programming the first circuit and the second circuit to compute the third data during a first multitude of emulation cycles and compute the fourth data during a second multitude of emulation cycles different from the first multitude of emulation cycles.

According to one embodiment of the present invention, a system for configuring a hardware verification system is presented. The system is configured to receive a first data representative of a first design of an integrated circuit, when the system is invoked to configure the verification system, and to transform the first data into a second data representative of a second design. The second design includes a functionality of the first design, and a first circuit adapted to compute a third data representative of a power consumption of a first portion of the first design when the hardware verification system is configured with the second data and run. The first circuit is further adapted to be programmable without reconfiguring the second design.

According to one embodiment, the first circuit is further adapted to be programmable to select the first portion when the hardware verification system is run. According to one embodiment, the first circuit is further adapted to transmit the third data when the third data is equal to or larger than a predetermined threshold. According to one embodiment, the third data is adapted to be received intermittently by a software module that accumulates the third data during a multitude of cycles of the hardware verification system.

According to one embodiment, the first circuit is further adapted to compute the third data during one cycle of the hardware verification system. According to one embodiment, the first circuit is further adapted to identify a first number of transitions of a first signal of the first portion, and to multiply the first number by a fourth data indicative of a power consumption associated with the first signal to form a first weighted count when the hardware verification system is run.

According to one embodiment, the first circuit is further adapted to identify a second number of transitions of a second signal of the first portion, to multiply the second number of transitions of the second signal by a fifth data indicative of a power consumption associated with the second signal to form a second weighted count, and to add the first weighted count and the second weighted count to determine the third data. According to one embodiment, the first circuit is further adapted to add a first value of the third data during one cycle of the hardware verification system and a second value of the third data during another cycle of the hardware verification system to form an accumulated third data.

According to one embodiment, the first circuit is further adapted to transmit the accumulated third data when the accumulated third data is equal to or larger than a predetermined threshold. According to one embodiment, the second data further includes a second circuit adapted to compute a fourth data representative of a power consumption of a second portion of the first design different from the first portion. The system is further adapted to program the first circuit and the second circuit to compute the third data and the fourth data such that a portion of the computation occurs during a same multitude of emulation cycles.

According to one embodiment of the present invention, a computer-aided method for configuring a hardware verification system is presented. The method includes receiving, by the computer, a first data representative of a first design of an integrated circuit, when the computer is invoked to configure the verification system, and transforming, using the computer, the first data into a second data representative of a second design. The second design includes a functionality of the first design, and a first circuit adapted to compute a third data representative of a power consumption of a first portion of the first design when the hardware verification system is configured with the second data and run. The first circuit is further adapted to intermittently transmit the third data when the third data is equal to or larger than a predetermined threshold. According to one embodiment, the first circuit is programmable without reconfiguring the second design represented by the second data.

According to one embodiment of the present invention, a system for configuring a hardware verification system is presented. The system is configured to receive a first data representative of a first design of an integrated circuit, when the system is invoked to configure the verification system, and transform the first data into a second data representative of a second design. The second design includes a functionality of the first design, and a first circuit adapted to compute a third data representative of a power consumption of a first portion of the first design when the hardware verification system is configured with the second data and run. The first circuit is further adapted to intermittently transmit the third data when the third data is equal to or larger than a predetermined threshold. According to one embodiment, the first circuit is further adapted to be programmable without reconfiguring the second design represented by the second data.

A better understanding of the nature and advantages of the embodiments of the present invention may be gained with reference to the following detailed description and the accompanying drawings

BRIEF DESCRIPTION OF THE DRAWINGS

FIG. 6A depicts a simple exemplary actual toggle activity versus emulation cycles of a portion of the initial circuit design depicted in FIG. 1 after transformation without using embodiments of the present invention.

FIG. 6B depicts a simple exemplary expanded portion of actual toggle activity versus emulation cycles between two different cycles depicted in FIG. 6A without using embodiments of the present invention.

FIG. 6C depicts a simple exemplary reported toggle activity versus the emulation cycles of the portion of the initial circuit design depicted in FIG. 6A after transformation, in accordance with one embodiment of the present invention.

FIG. 6D depicts a simple exemplary expanded portion of reported toggle activity versus emulation cycles between two different cycles depicted in FIG. 6C, in accordance with one embodiment of the present invention.

DETAILED DESCRIPTION

Figure 1:
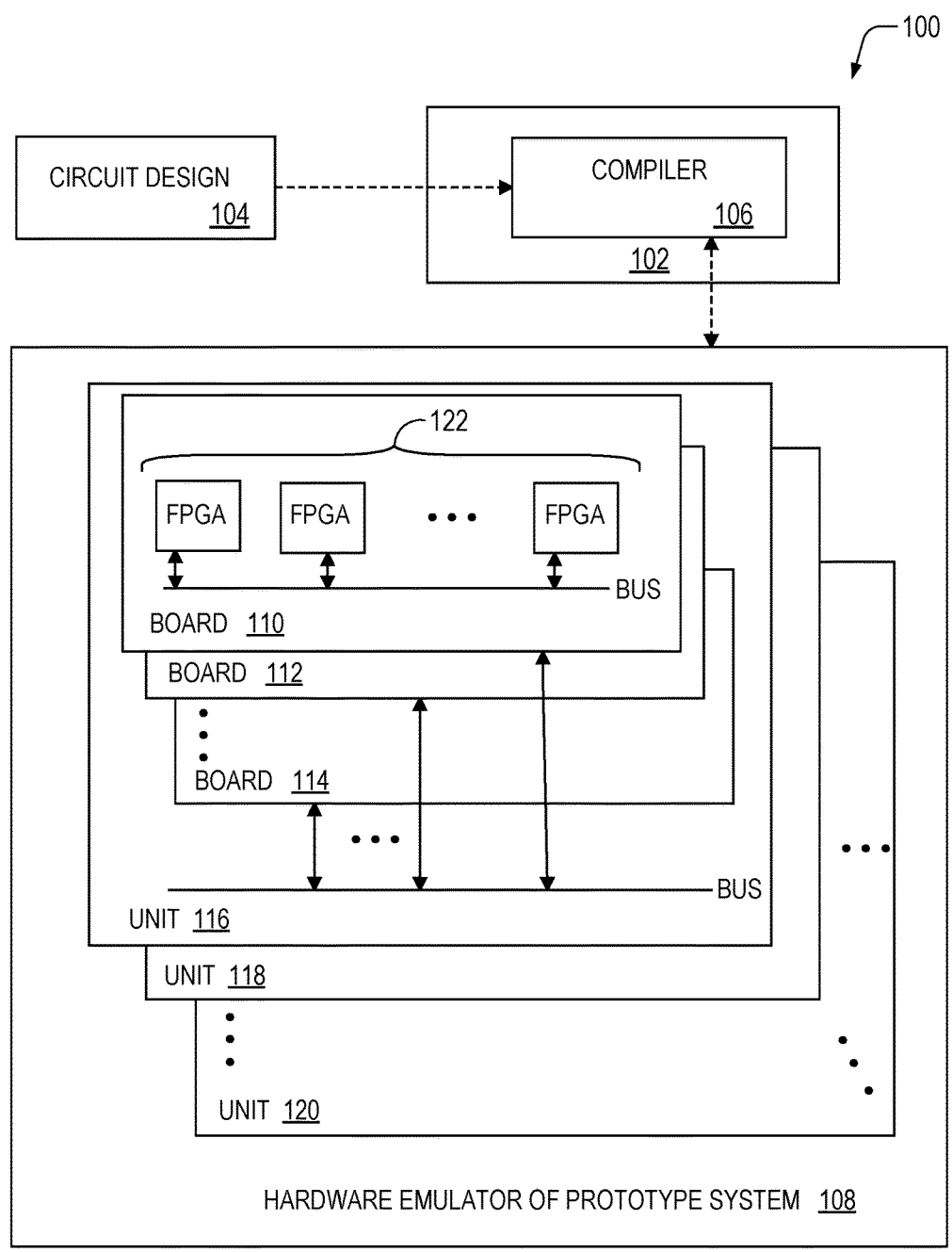
FIG. 1 depicts an exemplary high-level block diagram of a hardware verification system, in accordance with one embodiment of the present invention.

FIG. 1 depicts an exemplary high-level block diagram of a hardware verification system 100, in accordance with one embodiment of the present invention. Hardware verification system 100 may be used to verify, test or debug an initial circuit design 104, i.e. the DUT. Hardware verification system 100 may include a hardware emulator or prototype system 108 and a computer system 102 that is described in reference to FIG. 9. As depicted in FIG. 1, hardware emulator or prototype system 108 may be coupled to computer system 102, which may include a compiler 106 module that may receive a hardware description language (HDL) representation of the initial circuit design 104.

Compiler 106 may include a multitude of various software modules that may or may not include a dedicated compiler module. Compiler 106 may transform, change, reconfigure, add new functions to, and/or control the timing of initial circuit design 104 to facilitate verification, emulation, or prototyping of initial circuit design 104. Further, compiler 106 may compile initial circuit design 104 and any associated changes into a binary image used to program hardware emulator or prototype system 108.

Thus the logical functions and timing of initial circuit design 104 that may ultimately be implemented by hardware in an IC chip may instead be first implemented in hardware emulator or prototype system 108. Among other advantages, verification of initial circuit design 104 in hardware may be accomplished at much higher speed than by software verification alone.

Hardware emulator or prototype system 108 may include a multitude of emulator units, e.g., unit 116, unit 118, through unit 120, each including one or more circuit boards, e.g., board 110, board 112, through board 114. Each board may include one or more programmable processors 122, such a Field Programmable Gate Arrays (FPGAs), and other blocks (not shown), such as memories, input/output devices, other processors, and the like. Hardware emulator or prototype system 108 receives a compiled initial circuit design 104 from compiler 106, and programs programmable processors 122 to verify behavior of the circuit design. Hardware emulator or prototype system 108 may include a primary or master system clock from which a number of other clock signals may be generated.

"Programmable device" in this context refers to an IC designed to be configured and/or reconfigured after manufacturing. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

There are two major types of power consumption in a modern digital IC. The first type is leak power, and the second type is transition power. The leak power is a function of supply voltage, logic gate attributes, such as for example geometry, semiconductor characteristics, and gate operating levels, such as for example output voltage. The transition power is a function of supply voltage, logic gate attributes, circuit interconnect or net parasitic capacitance and the like, and circuit activity. The supply voltage, logic gate attributes, and circuit interconnect parasitic capacitance may be predetermined or derived as constant parameters in a digital IC design. Traditionally, to obtain accurate power estimation, users first run logic simulation, or alternatively, hardware emulation, to obtain the realistic time-variant gate levels and transition activities. These are applied as inputs to an analog simulator together with the previously mentioned gate and net parameters to simulate the transition voltages and currents of each components of the digital IC in order to obtain the IC power consumption using simulation.

A method for simulating power consumption of an IC is disclosed that includes t approximating an accurate but slow power simulation into simple first order or conditional first order equations that are to be calculated when hardware emulation is run. The coefficients or weights of the first order equations are derived from the supply voltage, gate attributes, and net parasitic capacitance such as for example among potential circuit parameters. Transition equation conditions, which are described below in reference to Equation 1, and variables, such as for example signals of the DUT, are obtained by logic simulation or emulation. Computing these equations during emulation is usually much faster than performing the regular power simulation.

Figure 2:
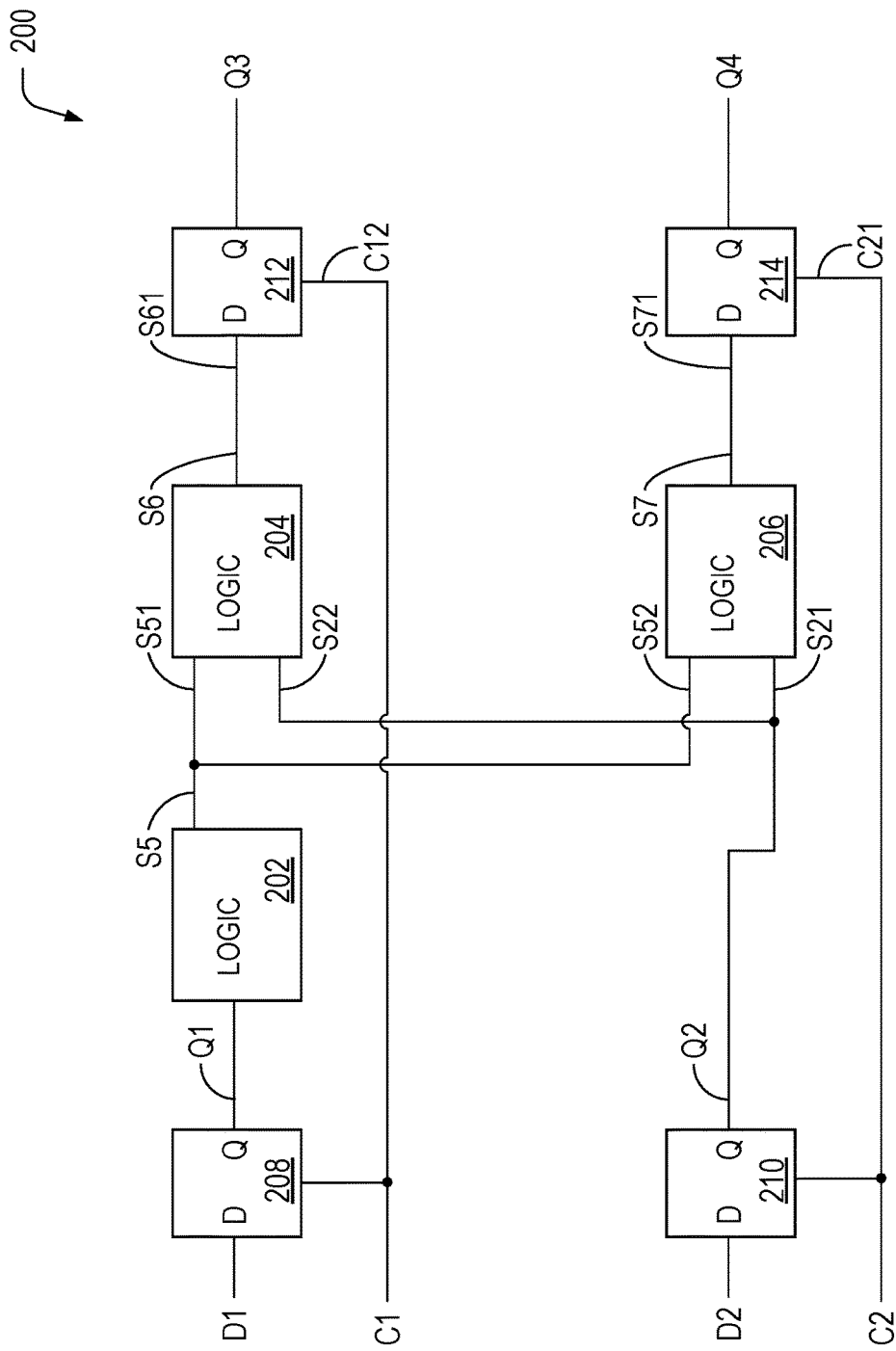
FIG. 2 depicts data representing an exemplary schematic of a circuit portion of the initial circuit design depicted in FIG. 1 before transformation that may be used by embodiments of the present invention.

FIG. 2 depicts data representing an exemplary schematic of a circuit portion 200 of initial circuit design 104 depicted in FIG. 1 before transformation that may be used by embodiments of the present invention. Circuit portion 200 may include a logic 202, a logic 204, a logic 206, a flip-flop 208, a flip-flop 210, a flip-flop 212, and a flip-flop 214. A previously known power simulation may simulate the logic activities of logic 202, logic 204, and logic 206, and calculate the dynamic transition power consumption for flip-flop 208, flip-flop 210, flip-flop 212, and flip-flop 214, and combinational logic such as cells, I/O such as cell ports, and nets such as interconnects. In this example, at least nineteen variables, i.e. nineteen signals, which are D1, D2, Q1, Q2, Q3, Q4, C1, C2, C12, C21, S5, S51, S52, S21, S22, S6, S61, S7, and S71, plus additional variables in the combinational logic are simulated to derive the final power values. A previously known power simulation will simulate the logic activities, and calculate the transition power consumption, for all flip-flops and combinational logic, I/O, and nets of this DUT.

The coefficients or weights of the first order equations may be derived from the supply voltage, gate attributes, and net parasitic capacitance, and the like. The dynamic transition equation conditions and the variables may be obtained by a logic simulation or an emulator. Computation of these equations during emulation using the embodiments disclosed herein may be performed faster than by performing the previously known power simulation.

With the weighted toggle count approach, only four time-variant signals or variables, such as flip-flop output signals, $Q1(t)$, $Q2(t)$, $Q3(t)$, and $Q4(t)$ are needed to obtain the dynamic transition toggle activity. In addition, the power equation is simplified into:

$$\text{Power} = w1*\text{toggle}(Q1(t)) + w2*\text{toggle}(Q2(t)) + w3*\text{toggle}(Q3(t)) + w4*\text{toggle}(Q4(t)) \qquad \text{Equation 1}$$

The terms w1, w2, w3, and w4 are constant weights associated with the signals $Q1(t)$, $Q2(t)$, $Q3(t)$, $Q4(t)$, respectively and the toggle(Q(t)) is a count of the number of transitions per sampling time, t associated with the respective signals. Sampling time may be triggered by a sample signal to be described below in reference to FIG. 5.

Referring to FIG. 2, as the number of variables are reduced from nineteen to four, and the calculations are simplified into first-order equations instead of a complex analog simulation, computation speed may increase significantly. The corresponding weights, e.g. w1, w2, w3, w4, may be pre-derived based on the characteristic of the fan-out powers which may be influenced by the activity of the flip-flop outputs. An approximation for each of the corresponding weights is the fan-out size in terms of effective total loading capacitance. In examples in which multiple fan-ins drive the common combinational logic, and as a result, share some of the fan-out loading, the effective loading per fan-in or driver may be divided by the number of drivers.

Signal Q1 has influence on S5, S51 and S52. Signals Q1 and Q2 together have influence on S6, S61, S7, and S71. If the total loading capacitance for signals Q1, S5, S51 and S52 are C1, and the total loading capacitance for signals S6, S61, S7 and S71 is C2, the weight for signal Q1, w1, may be (C1+C2)/2. More accurate derivation of the weight may include the consideration of the function of the combination logic and the statistics or correlation of the inputs activity, which will derive weights not simply proportional to the size of the fan-outs. On the other hand, before the design is placed and routed for the targeted silicon, there is no capacitance information. In this case, node counts or net counts may be applied as approximation of loading capacitances for deriving the weights. In some simple examples, all weights may have a value of one.

Figure 3:
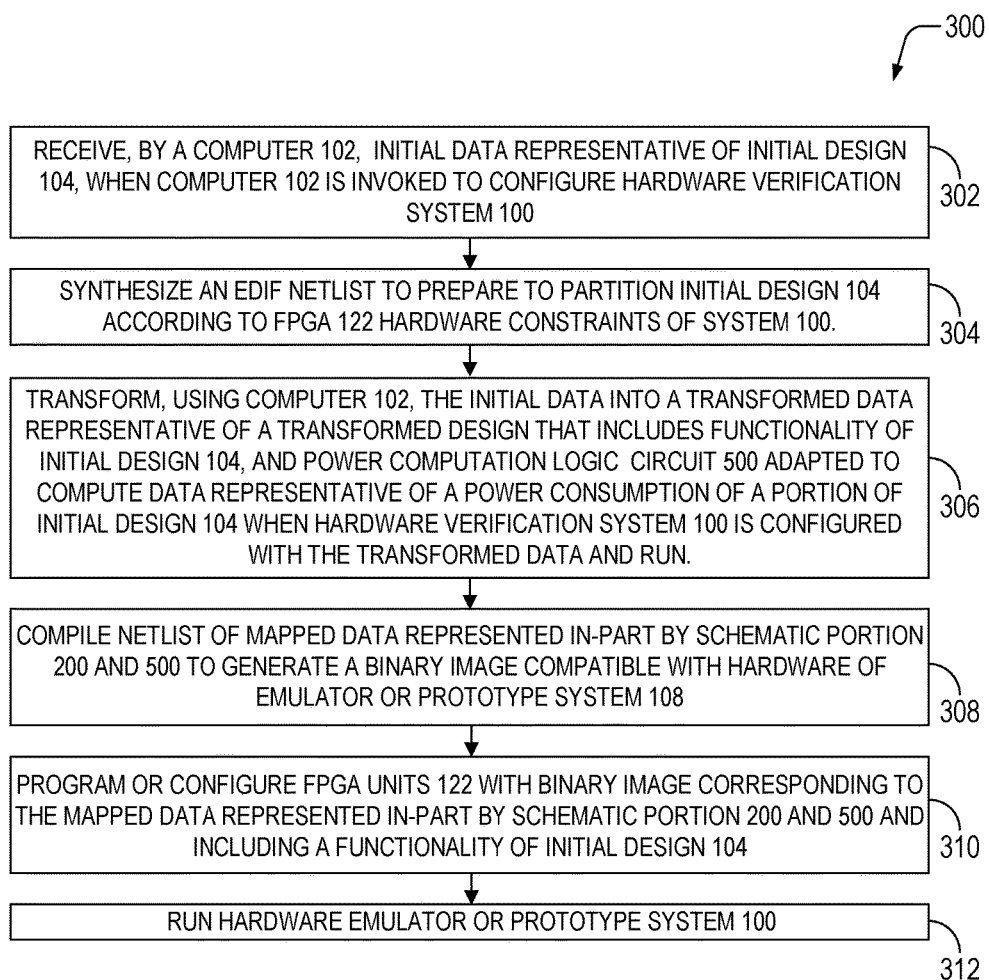
FIG. 3 depicts a simple exemplary flowchart for configuring the hardware emulator or prototype system depicted in FIG. 1, in accordance with one embodiment of the present invention.

FIG. 3 depicts a simple exemplary flowchart 300 for configuring the hardware emulator or prototype system depicted in FIG. 1, in accordance with one embodiment of the present invention. Referring simultaneously to FIG. 1 and FIG. 3, embodiments of the present invention add a power computation logic (PCL) circuit, described in more detail below, to initial circuit design 104 during configuration of hardware verification system 100. Flowchart 300 includes receiving 302, by computer system 102, initial circuit data, e.g. circuit portion 200, representative of initial circuit design 104, when computer 102 is invoked to configure the verification system, e.g. hardware emulator or prototype system 108.

Compiler 106 synthesizes 304 an EDIF netlist to prepare to partition initial circuit design 104 according to hardware constraints of programmable processors 122, e.g. FPGAs, of hardware emulator or prototype system 108. In some embodiments, the partitioning may be performed if the data representing initial circuit design 104 exceeds the mapping capabilities of one of programmable processors 122, e.g. one FPGA.

The compiler 106 then transforms 306 the initial data representing initial circuit design 104, such as circuit portion 200, into a transformed data representative of a transformed design that includes functionality of initial circuit design 104. The transformed design further includes the PCL circuit adapted to compute data representative of a power consumption of a portion of initial circuit design 104 when hardware verification system 100 is configured with the transformed data and run.

The netlist of mapped data represented in-part by the circuit portion 200 is compiled 308 to generate a binary image compatible with hardware emulator or prototype system 108. Programmable processors 122, e.g. FPGA units, may be programmed or configured 310 with the binary image corresponding to the mapped data represented in-part by circuit portion 200 and including the functionality of initial circuit design 104.

Hardware emulator or prototype system 108 may then be run 312 to compute power consumption of a portion of initial circuit design 104 at higher speed than is possible using previous simulation or emulation system approaches that fail to use the high power computation speed available in hardware emulator or prototype system 108 using the embodiments described herein.

The disclosed method next reduces the intermittent transition data (raw data and partial count data, see FIG. 4) transferring between the hardware emulator or prototype system 108 and the computer system 102.

Figure 4:
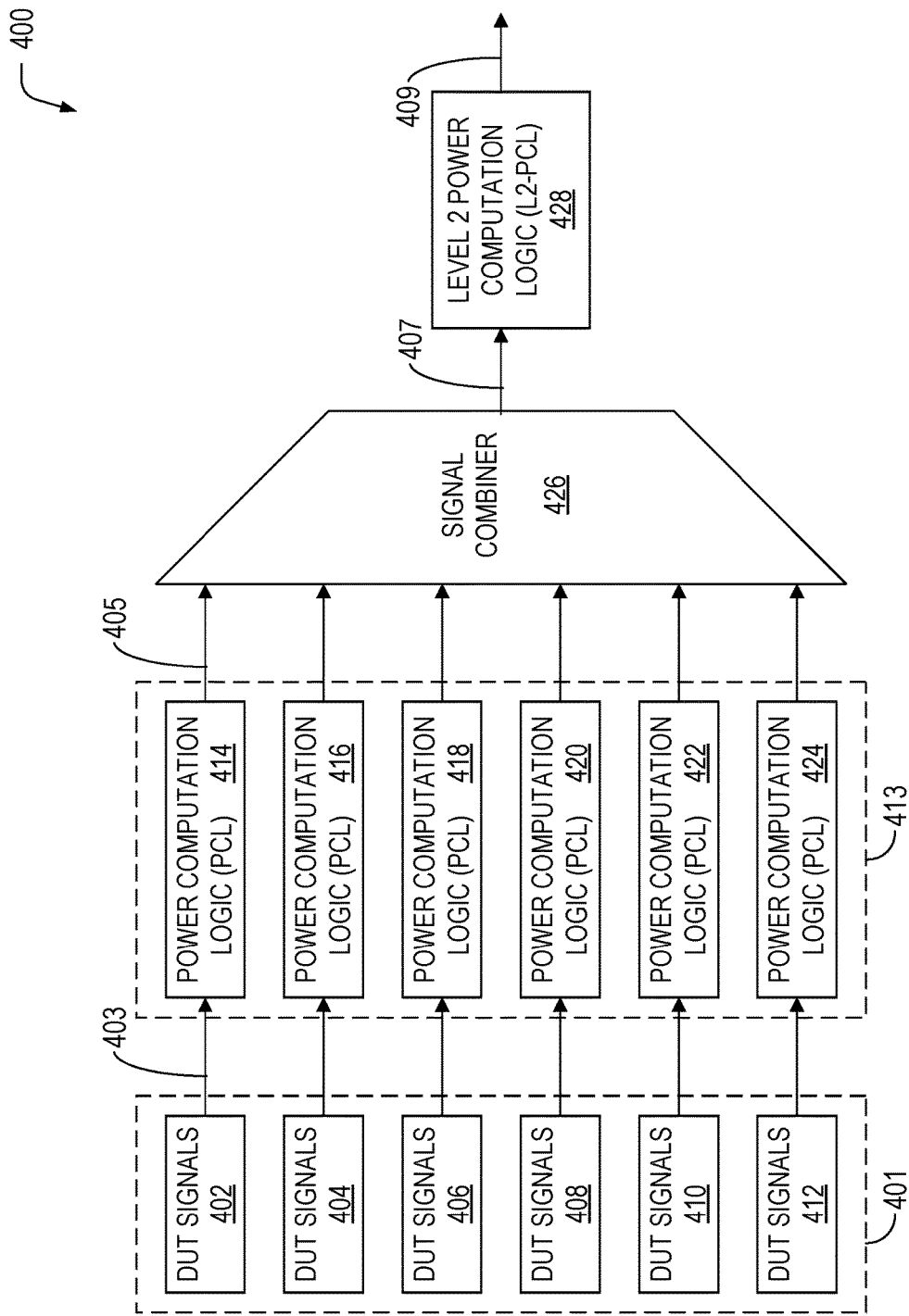
FIG. 4 depicts a power profiling system, in accordance with one embodiment of the present invention.

FIG. 4 depicts a power profiling system 400, in accordance with one embodiment of the present invention. Power profiling system 400 includes a DUT signals 401 and a level 1 power computation logic 413. DUT signals 401 includes a multitude of DUT signals 402-412. Level 1 power computation logic 413 includes a multitude of power computation logic 414-424. A multitude of raw transition data 403 are coupled between each one of the multitude of DUT signals 402-412 and each different associated one of the multitude of power computation logic 414-424. Power profiling system 400 further includes a signal combiner 426, a level 2 power computation logic 428, and a multitude of partial toggle counts 405 each coupled between each different one of the multitude of power computation logic 414-424 and signal combiner 426. Power profiling system 400 enables reducing the intermittent transition data, e.g. raw transition data 403 and partial toggle counts 405 data, transferring between hardware emulator or prototype system 108 and computer system 102.

Level 1 power computation logic 413 transforms raw transition data 403 into partial toggle counts 405 and sends partial toggle counts 405 to signal combiner 426. Partial toggle counts 405 have a reduced data size compared to raw transition data 403 from the multitude of DUT signals 402-412. Signal combiner 426 combines the multitude of partial toggle counts 405 and sends a combined partial toggle counts 407 to level 2 power computation logic 428.

Level 2 power computation logic 428 transforms combined partial toggle counts 407 into either a semi-final counts or a final counts 409 and sends the either semi-final counts or final counts 409 to computer system 102. Semi-final counts or final counts 409 have a reduced data size compared to partial toggle counts 405. In one embodiment, more than two levels of PCL may be utilized, e.g. a multitude of power profiling system 400 each provide a different semi-final counts to a second signal combiner that in-turn couples a second combined partial toggle counts to a level 3 power computation logic (not depicted).

The intermittent dynamic transition data, i.e., raw transition data 403 from DUT signals 402-412 or partial toggle count data 405 from the PCL outputs, to be reported between hardware emulator or prototype system 108 and computer system 102 may be reduced in size by the embodiments described herein. By way of example, the size of the raw transition data 403 from DUT signals 402-412 may be more than 100 M bits per DUT emulation cycle in a typical design for emulation. The size of partial toggle counts 405 may be 100 k bits per emulation cycle time. The size of semi-final or final counts 409 may be 1 k bits per emulation cycle time. Without application of level 1 power computation logic 413, the 100 M bits per emulation cycle raw transition data may need to be sent to computer system 102. Utilizing level 1 PCLs but not level 2 power computation logic 428, the 100 k bits per cycle time partial toggle counts may be sent to computer system 102 for final summation. With both level 1 and level 2 PCLs, only 1 k bits per cycle time may be sent to computer system 102. As the dynamic transition logic levels and activities are obtained from hardware emulator or prototype system 108, and the major computations are also performed in hardware emulator or prototype system 108, the intermittent dynamic transition data may transfer between adjacent or near-adjacent emulator components, e.g., within the same FPGA or between adjacent different FPGA, in parallel, at much higher bandwidth than without the use of the embodiments, such as using known simulation power computation.

Figure 5:
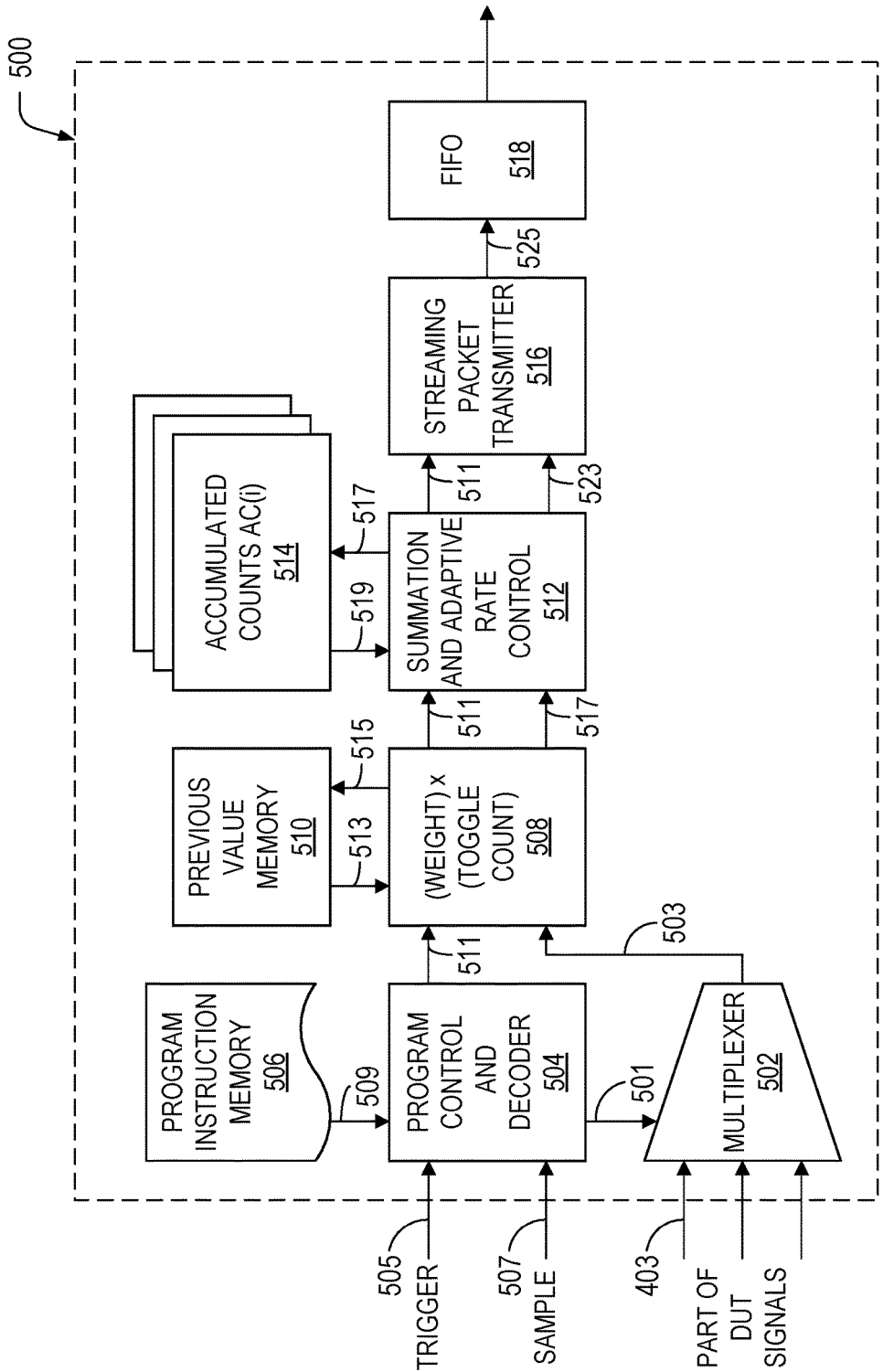
FIG. 5 depicts a power computation logic, in accordance with one embodiment of the present invention.

FIG. 5 depicts a PCL 500, in accordance with one embodiment of the present invention. PCL 500 may be re-configurable, e.g. programmable, so that testing different power schemes for the same DUT does not require spending additional computer resources on lengthy hardware re-compilation. PCL 500 includes a multiplexer 502, a program control and decoder 504, a program instruction memory 506, a (weight)×(toggle count) 508, a previous value memory 510, a summation and adaptive rate control 512, a multitude of accumulated counts 514, a streaming packet transmitter 516, and a FIFO 518.

Referring simultaneously to FIG. 4 and FIG. 5, multiplexer 502 may receive a part of DUT signals 403 and a multiplex address 501 from program control and decoder 504, and send a multiplexed signal 503 to the (weight)×(toggle count) 508. Multiplex address 501 may be utilized to select the DUT signals 403 processed by multiplexer 502.

Program control and decoder 504 may receive a trigger signal 505, the sample signal 507, and one or more program instructions 509 from the program instruction memory 506. Program control and decoder 504 sends multiplex address 501 to the multiplexer 502 and power group information 511 to the (weight)×(toggle count) 508. A power group or domain may be any portion of the DUT that a user wishes to measure with regards to power consumption. Trigger signal 505 and sample signal 507 may start the power measurement process during emulation and select a power group counter/index, i, along with a cycle count threshold (CCTH) and an accumulated counts threshold (ACTH) that will be described in greater detail below, where i may represent the different portions or selected power domains or power groups of the DUT. Power group information 511 includes power group counter/index i, the CCTH, and the ACTH that are all associated with the user selected power group or domain of the DUT.

(Weight)×(toggle count) 508 may receive multiplexed signal 503 from multiplexer 502, power group information 511 from program control and decoder 504, and a previous value of the DUT signal 513 that is associated with multiplexed signal 503 from the previous value memory 510. (Weight)×(toggle count) 508 may send a new value of the DUT signal 515 that is associated with multiplexed signal 503 to be stored by the previous value memory 510, and power group information 511 and a current weighted toggle count 517 to summation and adaptive rate control 512. (Weight)×(toggle count) 508 may use multiplexed signal 503 to determine weights, and may use previous value of the DUT signal 513 to determine the toggle count. (Weight)×(toggle count) 508 multiplies the weight, i.e. $w_i$, and the toggle count, i.e. toggle($Q_i$), to determine current weighted toggle cycle count 517, as described by equation 1.

Previous value memory 510 may receive new value of the DUT signal 515 from (weight)×(toggle count) 508 and send previous value of the DUT signal 513 to (weight)×(toggle count) 508. Previous value memory 510 may iterate to provide (weight)–(toggle count) 508 with a count to determine the toggle count.

Summation and adaptive rate control 512 may receive power group information 511 and current weighted toggle count 517 from (weight)×(toggle count) 508, and may receive from accumulated counts 514 an accumulated weighted toggle counts 519 associated with previous emulator cycles. Summation and adaptive rate control 512 may send current weighted toggle count 517 associated with the current emulator cycle to accumulated counts 514. Summation and adaptive rate control 512 may further send power group information 511 and an output counts 523 to streaming packet transmitter 516. Output counts 523 is associated with the "power" characterized by equation 1 above. Summation and adaptive rate control 512 compares current weighted toggle count 517 to the CCTH and compares accumulated weighted toggle counts 519 to the ACTH. If either threshold, CCTH or ACTH, is met or exceeded, summation and adaptive rate control 512 sends power group information 511 and output counts 523 to streaming packet transmitter 516.

Accumulated counts 514 may receive current weighted toggle count 517 from summation and adaptive rate control 512 and send accumulated weighted toggle counts 519 to summation and adaptive rate control 512. Accumulated weighted toggle counts 519 may be determined by summation and adaptive rate control 512 sending current weighted toggle counts 517 to accumulated counts 514 and accumulated counts 514 updating the accumulated counts, AC[i], which is described below in reference to element 608 in FIG. 6.

Referring again to FIG. 5, streaming packet transmitter 516 may receive power group information 511 and output counts 523 from summation and adaptive rate control 512 and send a reporting packet 525 to FIFO 518. Reporting packet 525 may include the packet type, power group information 511, current weighted toggle count 517, and accumulated weighted toggle count 519, and may be formatted as "Packet type (power)-power group index (i)-CC-AC", where CC is current weighted toggle count 517 and AC is accumulated weighted toggle count 519.

FIFO 518 may receive reporting packet 525 from streaming packet transmitter 516 and send reporting packet 525 to the host computer, e.g. computer 102, or to a next programmable logic block such as for example signal combiner 426.

PCL 500 provides that a different power scheme, i.e. power domain definitions, of the same DUT may not require emulator hardware re-compilation. Exemplary power scheme computations may include, but are not limited to, a computation of all power of the entire DUT together, a separate computation of power for each different DUT power domain, or a separate computation of the power of each clock domain of the DUT, and the like. Each operation performed by PCL 500 may be encoded as one instruction or as multiple instructions stored in program instruction memory 506.

For example, to compute all power of the entire DUT, program instruction memory 506 may be programmed to select all signals from the DUT flip-flops, and use one (1) toggle counter with index i=0, in Accumulated Counts 514 such that all signal activities will be accumulated in AC[0] in accumulated counts 514, and report to the host computer when the ACTH or CCTH is reached. Pairs of (CC[0], AC[0]) from multiple PCL 500 may be received by the host computer at a time, and may add CCs or ACs together to obtains the total weighted toggle count. In some embodiments, a level 2 PCL may add the counts together such that the host computer receives a single pair of total counts per a certain hardware scope, e.g., an FPGA, a hardware board, or the entire emulator.

In another example that is enabled by having programmability in PCL 500, to compute power of each DUT portion or power group or domain which connects to a certain PCL, the program instruction memory 506 of that individual PCL may be programmed to use a unique toggle counter index i for each portion, and select the signals in each DUT hierarchy which are connected to this PCL. Each hierarchy may associate with different instruction(s), which may be loaded together into the program instruction memory 506 at non-overlapped addresses. As a result, during one emulation or sample cycle, the different PCLs may sequentially run separate programs, each separate program being associated with a different power domain. How DUT signals are connected to PCLs in the emulator is not required to be dependent on the original DUT design hierarchies; therefore, the program instruction memory 506 may differ per DUT hierarchy and per PCL.

For example, referring simultaneously to FIG. 4 and FIG. 5, PCL 414 may be adapted to compute the output counts for a power consumption of a first portion or power domain of the DUT, and PCL 416 may be adapted to compute output counts for a power consumption of a second power domain of the DUT different from the first power domain. In a first embodiment, PCL 414 and PCL 416 may be programmed to compute the power consumption of the first power domain and the second power domain such that a portion of the computation occurs during a same multitude of emulation cycles. In a second embodiment, PCL 414 and PCL 416 may be programmed to compute the power consumption of the first power domain during a first multitude of emulation cycles and compute the power consumption of the second power domain during a second multitude of emulation cycles different from the first multitude of emulation cycles. In a third embodiment, the first power domain and the second power domain may each include the same DUT signal A. In a fourth embodiment, the first power domain and the second power domain may each include the same DUT signal B but do not include the same DUT signal A. The first, second, third, and fourth embodiments are programmed into PCL 414 and PCL 416 without having to reconfigure the emulator, which saves time.

FIG. 6A depicts a simple exemplary actual toggle activity 600A versus emulation cycles of a portion of initial circuit design 104 depicted in FIG. 1 after transformation without using embodiments of the present invention. Actual toggle count 602 is plotted on the Y-axis and emulation cycle count 603 is plotted on the x-Axis. Actual weighted toggle activity 600A is depicted over a relatively large number of cycles that include a cycle A, cyA, and a cycle B, cyB.

FIG. 6B depicts a simple exemplary expanded portion of actual toggle activity 600B versus emulation cycles between two different cycles, cyA and cyB, depicted in FIG. 6A without using embodiments of the present invention. Expanded portion of actual toggle activity 600B includes an actual weighted toggle count over a single cycle 605 and a slower changing actual weighted toggle count 607 over a range of cycles.

FIG. 6C depicts a simple exemplary reported toggle activity 600C versus the emulation cycles of the portion of initial circuit design 104 depicted in FIG. 6A after transformation, in accordance with one embodiment of the present invention. Reported toggle count 604 is plotted on the Y-axis and emulation cycle count 603 is plotted on the x-Axis. Reported toggle activity 600C includes a low reported toggle rate zone 609 depicted by dark fill pattern under the curve of reported toggle activity 600C. Reported toggle activity 600C further includes a high reported toggle rate zone 611 depicted by dark fill pattern under the curve of reported toggle activity 600C.

FIG. 6D depicts a simple exemplary expanded portion of reported toggle activity 600D versus emulation cycles between two different cycles, cyA and cyB, depicted in FIG. 6C, in accordance with one embodiment of the present invention. FIG. 6D depicts actual weighted toggle count over a single cycle 605 and slower changing actual weighted toggle count 607 over a range of cycles depicted as a dotted plot only for comparison purposes and not to be confused with embodiments of expanded portion of reported toggle activity 600D described below.

Referring simultaneously to FIG. 5 and FIG. 6D, Expanded portion of reported toggle activity 600D includes a multitude of reported output counts 523, which in-turn include an output count 610, 612, 614. Expanded portion of reported toggle activity 600D further includes a CCTH 606 and an ACTH 608. As described above, output counts 523 are reported or sent when either CCTH 606 or ACTH 608 is met or exceeded. CCTH 606 is depicted by a horizontal dotted line. ACTH 608 is an area depicted by as a grey rectangle representing the accumulation of toggle activity over emulation cycle time. At an emulation cycle C, cyC, ACTH 608 is met or exceeded causing output count 610 to be sent. Output count 610 is the same value over a multitude of emulation cycles or range of cycles but still approximates actual weighted toggle count 607 over the same range of cycles. After reporting output count 610 at cyC, the associated [AC(i)] in accumulated counts 514 are cleared to start accumulating a new accumulated weighted toggle counts 519.

At an emulation cycle D, cyD, ACTH 608 is met or exceeded causing output count 612 to be sent. Output count 612 is a higher value than the value of output count 610 and approximates actual weighted toggle count 607 over the range of cycles between cyC and cyD as the actual weighted toggle count 607 continues to rise above its previous values. Accordingly, the area under each output count 610 and 612 are both equal to ACTH 608. After reporting output count 612 at cyD, the associated [AC(i)] in accumulated counts 514 are cleared to start accumulating a new accumulated weighted toggle counts 519.

At an emulation cycle E, cyE, CCTH 608 is met or exceeded by current weighted toggle count 517 causing an output count 614, depicted as a dot-dashed rectangle, to be sent that includes a AC(i) value output count 616 plus the CC(i) value equal to actual weighted toggle count over a single cycle 605. The area under output count 616 may be less than ACTH 608 because CCTH 608 is met or exceeded before the AC(i) value of output count 616 can reach ACTH 608. After reporting output count 614 at cyE, the associated [AC(i)] in accumulated counts 514 are cleared to start accumulating a new accumulated weighted toggle counts 519. The process is repeated over the desired emulation cycle range resulting in a close stepwise approximation to the curve of actual weighted toggle count 607, which in turn is nearly equal to the actual power curve of the DUT in accordance with equation 1 described above. Any emulation cycle of emulation cycle count 603 when output counts 523 are sent or reported, i.e. cyC, cyD, cyE are called a reporting cycle.

The number or count of emulation cycles of the emulated DUT between a pair of immediately adjacent reporting cycles is the reporting cycle time, e.g. (cyD-cyC), (cyE-cyD), and so on. Note that (cyD-cyC) does not equal (cyE-cyD). The reporting cycle time may vary from one to thousands or even millions of DUT emulation cycles. For example, the reporting cycle time for an emulation cycle F, cyF, is one emulation cycle, the reporting cycle time between an emulation cycle G, cyG, and an emulation cycle H, cyH, is thirty (30) emulation cycles, and the reporting cycle time between an emulation cycle J, cyJ, and an emulation cycle K, cyK, is two-hundred and fifty (250) emulation cycles, where cyF, cyG, cyH, cyJ, and cyK are each a reporting cycle. High reported toggle rate zone 611 may yield more frequent reporting, shorter reporting cycle time (finer DUT emulation cycle granularity), and a higher average reporting data amount per DUT emulation cycle. Low reported toggle rate zone 609 may yield less frequent reporting, longer reporting cycle time (less DUT emulation cycle granularity), and a lower average reporting data amount per DUT emulation cycle.

Lengthening the reporting cycle time may reduce how often the weighted toggle count data representing power needs to be sent and, as a result, may allow the emulator-to-host-computer communication channel to finish data transfer earlier. Thus, the communication channel may not be a bottleneck to the execution of the emulator. Thus, the channel bandwidth usage may be optimized by using more channel bandwidth at high reported toggle rate zone 611 and saving channel bandwidth at low reported toggle rate zone 609.

Accordingly, output counts 523 may not be reported periodically or with periodicity, i.e. output counts 610, 612, 614 do not have the same reporting cycle time. A multitude of reporting cycle times may not be equal and may instead each be different especially during high reported toggle rate zone 611. In other words, the weighted toggle rate data associated with power and reported by output count 523 may be reported intermittently whenever CCTH 606 or ACTH 608 is met or exceeded, which is associated with the power consumption of the selected power domain of the emulated DUT over the selected range of emulation cycles and not associated with a user selected or predetermined periodic reporting frequency.

Figure 7:
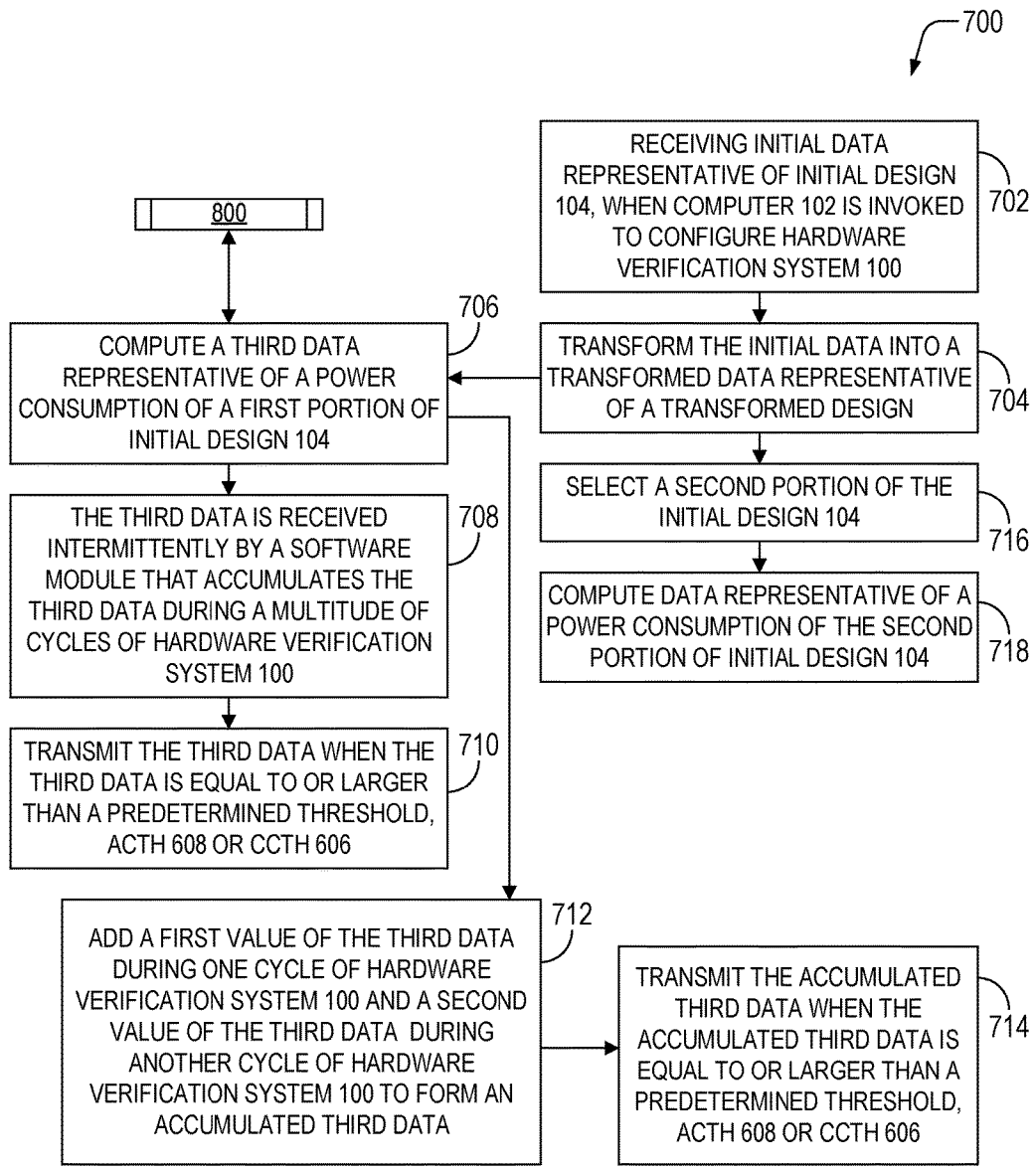
FIG. 7 depicts a simple exemplary flowchart for transforming and transmitting data representative of a power consumption of a portion of the initial circuit design depicted in FIG. 1, in accordance with one embodiment of the present invention.

FIG. 7 depicts a simple exemplary flowchart 700 for transforming and transmitting data representative of a power consumption of a portion of initial circuit design 104 depicted in FIG. 1, in accordance with one embodiment of the present invention. Referring simultaneously to FIG. 1 and FIGS. 4-7, flowchart 700 includes receiving 702 an initial data representative of initial circuit design 104, when computer 102 is invoked to configure hardware verification system 100. The initial data is transformed 704 into a transformed data representative of a transformed design. The transformed design may include a functionality of initial circuit design 104 and PCL 414 circuit adapted to compute 706 output counts 523 data representative of a power consumption of a first portion of initial circuit design 104 using DUT signals 402 when hardware verification system 100 is configured with the transformed data and run.

PCL 500 circuit is adapted to compute output counts 523 data as described below in reference to flowchart 800 depicted herein as a subroutine block. PCL 500 circuit is adapted such that output counts 523 data is received intermittently 708 by a software module that accumulates the output counts 523 data during a multitude of cycles of hardware verification system 100. PCL 500 circuit is adapted to transmit 710 output counts 523 data when output counts 523 is equal to or larger than a predetermined threshold, i.e. CCTH 606 or ACTH 608.

PCL 500 circuit is adapted to add 712 a first value of current weighted toggle count 517 of output counts 523 data during one cycle of hardware verification system 100 and a second value of current weighted toggle count 517 data during another cycle of hardware verification system 100 to form an accumulated weighted toggle counts 519 data. PCL 500 circuit is adapted to transmit 714 the accumulated weighted toggle counts 519 data when the accumulated third data is equal to or larger than a predetermined threshold, i.e. CCTH 606 or ACTH 608.

PCL 416 circuit is adapted to select 716 a second portion using DUT signals 404 of initial circuit design 104 and compute 718 output counts 523 data representative of a power consumption of the second portion of initial circuit design 104 when hardware verification system 100 is run.

In one embodiment, PCL 414 circuit may further be adapted to be programmed without reconfiguring the transformed design represented by the transformed data. PCL 414 circuit may be further adapted to be programmed to select the first portion of initial circuit design 104 with DUT signals 402 when hardware verification system 100 is run. PCL 414 circuit may be further adapted to compute the output counts 523 data during one cycle of hardware verification system 100.

In some embodiments, the transformed data may further include a transformed circuit adapted to compute output counts 523 data representative of a power consumption of a second portion of initial circuit design 104 with DUT signals 404 different from the first portion and summation and signal combiner 426 circuit adapted to compute a sum of the output counts 523 data from the first and second portions when hardware verification system 100 is run.

In one embodiment, the transformation may further include partitioning initial circuit design 104 data into hardware verification system 100 and inserting ACL 500 circuit into the partitioned initial circuit design 104 data.

Figure 8:
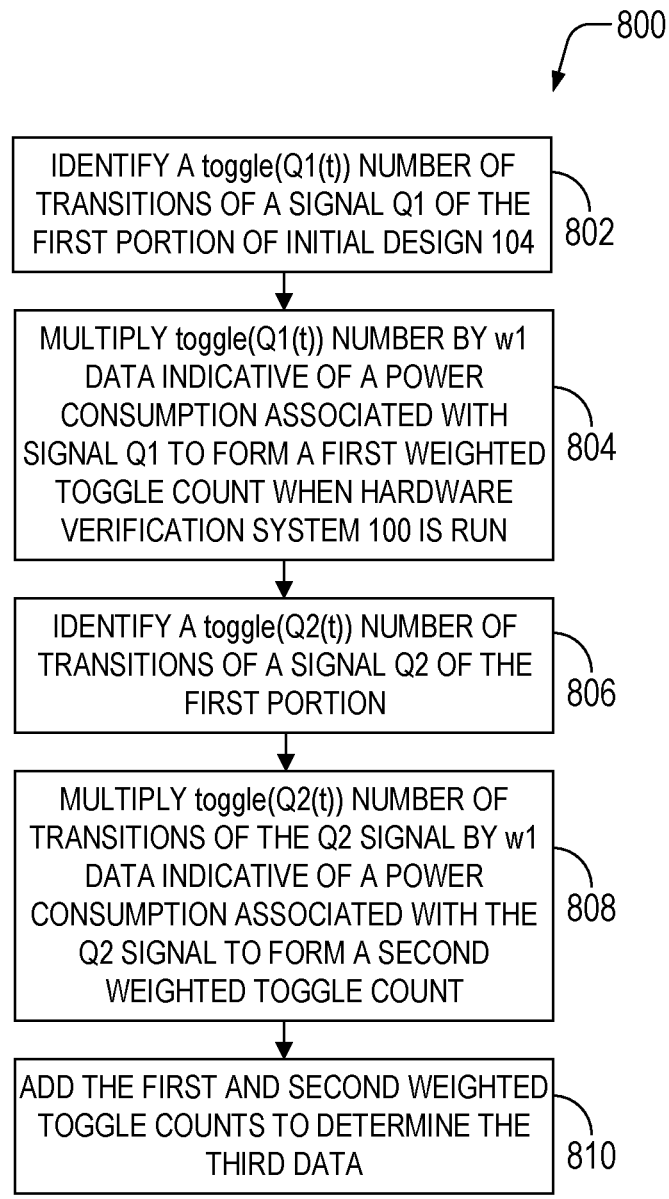
FIG. 8 depicts a simple exemplary flowchart for operations of the power computation logic depicted in FIG. 7, in accordance with one embodiment of the present invention.

FIG. 8 depicts a simple exemplary flowchart 800 for operations of PCL 500 depicted in FIG. 7, in accordance with one embodiment of the present invention. Referring simultaneously to FIG. 8 and equation 1, flowchart 800 depicts a subroutine that computes output counts 523 data in hardware verification system 100. A subroutine block 800 adapts PCL 500 circuit to identify 802 the toggle($Q1(t)$) number of transitions of a signal Q1 of the first portion or power domain of initial circuit design 104. PCL 500 circuit is adapted to multiply 804 the toggle($Q1(t)$) number by the w1 data indicative of a power consumption associated with signal Q1 to form a first current weighted toggle count 517 when hardware verification system 100 is run.

PCL 500 circuit is adapted to identify 806 the toggle(Q2 (*t*)) number of transitions of signal Q2 of the first portion. PCL 500 circuit is adapted to multiply 808 the toggle(Q2(*t*)) number by w2 data indicative of a power consumption associated with signal Q2 to form a second current weighted toggle count 517. PCL 500 circuit is adapted to add 810 the first and second current weighted toggle count 517 to determine output counts 523 data.

Figure 9:
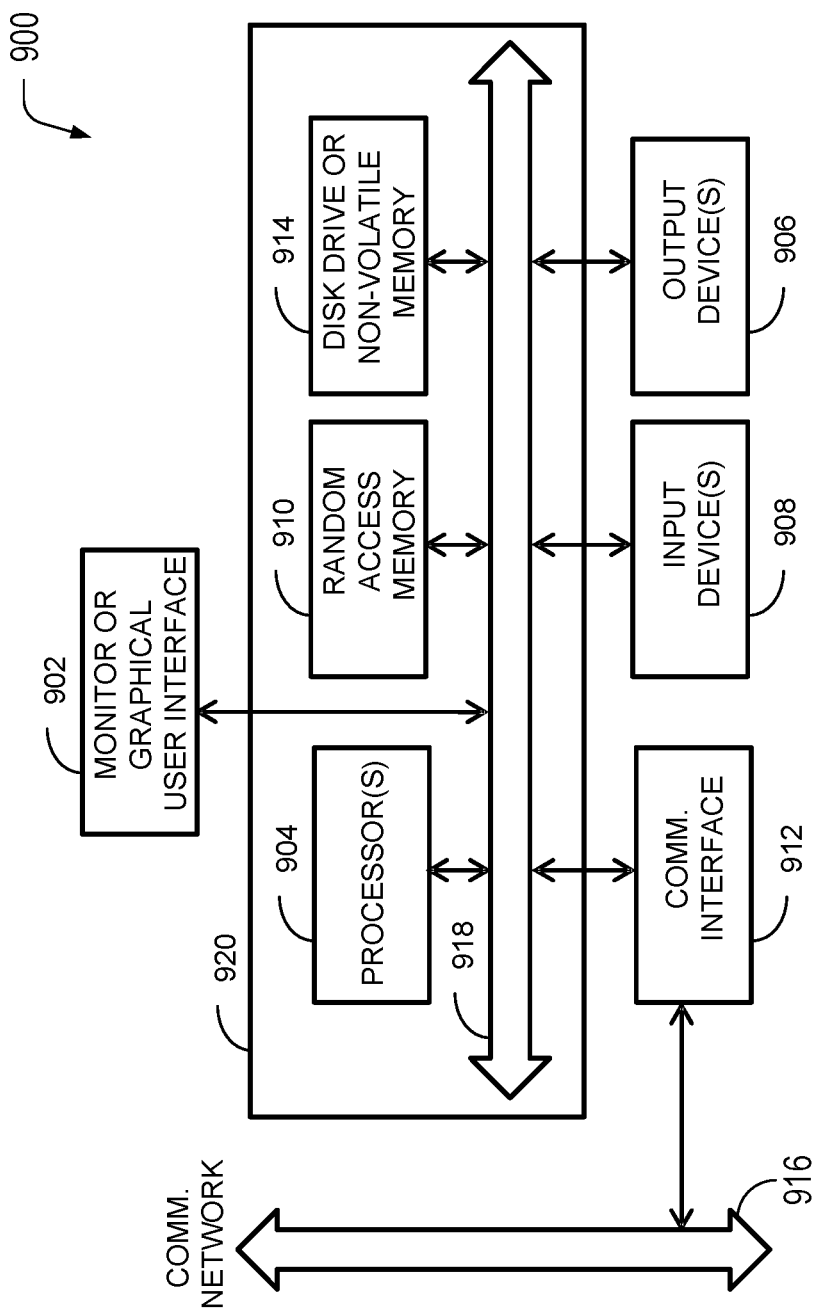
FIG. 9 depicts an example block diagram of a computer system that may incorporate embodiments of the present invention.

FIG. 9 is an example block diagram of a computer system 900 that may incorporate embodiments of the present invention. FIG. 9 is merely illustrative of a machine system to carry out aspects of the technical processes described herein, and does not limit the scope of the claims. One of ordinary skill in the art would recognize other variations, modifications, and alternatives. In one embodiment, the computer system 900 typically includes a monitor or graphical user interface 902, a computer 920, a communication network interface 912, input device(s) 908, output device(s) 906, and the like.

As depicted in FIG. 9, the computer 920 may include one or more processor(s) 904 that communicate with a number of peripheral devices via a bus subsystem 918. These peripheral devices may include input device(s) 908, output device(s) 906, communication network interface 912, and a storage subsystem, such as a random access memory 910 and a disk drive or nonvolatile memory 914.

The input device(s) 908 include devices and mechanisms for inputting information to the computer 920. These may include a keyboard, a keypad, a touch screen incorporated into the monitor or graphical user interface 902, audio input devices such as voice recognition systems, microphones, and other types of input devices. In various embodiments, the input device(s) 908 are typically embodied as a computer mouse, a trackball, a track pad, a joystick, wireless remote, drawing tablet, voice command system, eye tracking system, and the like. The input device(s) 908 typically allow a user to select objects, icons, text and the like that appear on the monitor or graphical user interface 902 via a command such as a click of a button or the like.

The output device(s) 906 include all possible types of devices and mechanisms for outputting information from the computer 920. These may include a display (e.g., monitor or graphical user interface 902), non-visual displays such as audio output devices, etc.

The communication network interface 912 provides an interface to communication networks (e.g., communication network 916) and devices external to the computer 920. The communication network interface 912 may serve as an interface for receiving data from and transmitting data to other systems. Embodiments of the communication network interface 912 typically include an Ethernet card, a modem (telephone, satellite, cable, ISDN), (asynchronous) digital subscriber line (DSL) unit, FireWire interface, USB interface, and the like. For example, the communication network interface 912 may be coupled to the communication network 916 via a FireWire bus, or the like. In other embodiments, the communication network interface 912 may be physically integrated on the motherboard of the computer 920, and may be a software program, such as soft DSL, or the like.

In various embodiments, the computer system 900 may also include software that enables communications over a network such as the HTTP, TCP/IP, RTP/RTSP protocols, and the like. In alternative embodiments, other communications software and transfer protocols may also be used, for example IPX, UDP or the like. In some embodiments, the computer 920 in the processor(s) 904 may include one or more microprocessors from Intel®. Further, one embodiment, the computer 920 includes a UNIX-based operating system.

The random access memory 910 and the disk drive or nonvolatile memory 914 are examples of tangible media configured to store data and instructions to implement various embodiments of the processes described herein, including executable computer code, human readable code, or the like. Other types of tangible media include floppy disks, removable hard disks, optical storage media such as CD-ROMS, DVDs and bar codes, semiconductor memories such as flash memories, non-transitory read-only-memories (ROMS), battery-backed volatile memories, networked storage devices, and the like. The random access memory 910 and the disk drive or nonvolatile memory 914 may be configured to store the basic programming and data constructs that provide the functionality of the disclosed processes and other embodiments thereof that fall within the scope of the present invention.

Software code modules and instructions that implement embodiments of the present invention may be stored in the random access memory 910 and/or the disk drive or nonvolatile memory 914. These software modules may be executed by the processor(s) 904. The random access memory 910 and the disk drive or nonvolatile memory 914 may also provide a repository for storing data used by the software modules.

The random access memory 910 and the disk drive or nonvolatile memory 914 may include a number of memories including a main random access memory (RAM) for storage of instructions and data during program execution and a read only memory (ROM) in which fixed non-transitory instructions are stored. The random access memory 910 and the disk drive or nonvolatile memory 914 may include a file storage subsystem providing persistent (non-volatile) storage for program and data files. The random access memory 910 and the disk drive or nonvolatile memory 914 may include removable storage systems, such as removable flash memory.

The bus subsystem 918 provides a mechanism for letting the various components and subsystems of computer 920 communicate with each other as intended. Although the communication network interface 912 is depicted schematically as a single bus, alternative embodiments of the bus subsystem 918 may utilize multiple busses.

FIG. 9 is representative of a computer system capable of implementing embodiments of the present invention. It will be readily apparent to one of ordinary skill in the art that many other hardware and software configurations are suitable for use with embodiments of the present invention. For example, the computer may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of the present invention may be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The above descriptions of embodiments of the present invention are illustrative and not limitative. In addition, similar principles as described corresponding to latches and/or flops can be applied to other sequential logic circuit elements. Other modifications and variations will be apparent to those skilled in the art and are intended to fall within the scope of the appended claims.

What is claimed is:

1. A computer-aided method for configuring a hardware verification system, the method comprising:
   receiving, by the computer, a first data representative of a first design of an integrated circuit, when the computer is invoked to configure the verification system; and
   transforming, using the computer, the first data into a second data representative of a second design that includes:
      a functionality of the first design; and
      a first circuit generated by transformation to to compute a third data representative of a power consumption of a first portion of the first design when the hardware verification system is configured with the second data and run, wherein the first circuit is programmable without reconfiguring the second design, wherein the third data is received intermittently by a software module that accumulates the third data during a plurality of cycles of the hardware verification system.

2. The computer-aided method of claim 1, wherein the first circuit is programmable to select the first portion when the hardware verification system is run.

3. The computer-aided method of claim 1, wherein the first circuit is programmable to:
   select a second portion of the first design; and
   compute a fourth data representative of a power consumption of the second portion of the first design when the hardware verification system is run.

4. The computer-aided method of claim 1, wherein the first circuit transmits the third data when the third data is equal to or larger than a predetermined threshold.

5. The computer-aided method of claim 1, wherein the first circuit computes the third data during one cycle of the hardware verification system.

6. The computer-aided method of claim 1 further comprising:
   identifying, using the first circuit, a first number of transitions of a first signal of the first portion; and
   multiplying, using the first circuit, the first number by a fourth data indicative of a power consumption associated with the first signal to form a first weighted count when the hardware verification system is run.

7. The computer-aided method of claim 6 further comprising:
   identifying, using the first circuit, a second number of transitions of a second signal of the first portion;
   multiplying, using the first circuit, the second number of transitions of the second signal by a fifth data indicative of a power consumption associated with the second signal to form a second weighted count; and
   adding, using the first circuit, the first weighted count and the second weighted count to determine the third data.

8. The computer-aided method of claim 1 further comprising adding, using the first circuit, a first value of the third data during one cycle of the hardware verification system and a second value of the third data during another cycle of the hardware verification system to form an accumulated third data.

9. The computer-aided method of claim 8 further comprising transmitting, using the first circuit, the accumulated third data when the accumulated third data is equal to or larger than a predetermined threshold.

10. The computer-aided method of claim 1, wherein the second data further includes:
    a second circuit adapted to compute a fourth data representative of a power consumption of a second portion of the first design different from the first portion; and
    a third circuit adapted to compute a sum of the third data and the fourth data when the hardware verification system is run.

11. The computer-aided method of claim 1, wherein the second data further includes:
    a second circuit adapted to compute a fourth data representative of a power consumption of a second portion of the first design different from the first portion, the method further comprising:
    programming the first circuit and the second circuit to compute the third data and the fourth data such that a portion of the computation occurs during a same plurality of emulation cycles.

12. The computer-aided method of claim 11, wherein the first portion and the second portion each include a first signal.

13. The computer-aided method of claim 1, wherein the second data further includes:
    a second circuit adapted to compute a fourth data representative of a power consumption of a second portion of the first design different from the first portion, the method further comprising:
    programming the first circuit and the second circuit to compute the third data during a first plurality of emulation cycles and compute the fourth data during a second plurality of emulation cycles different from the first plurality of emulation cycles.

14. A system for configuring a hardware verification system, the system configured to:
receive a first data representative of a first design of an integrated circuit, when the system is invoked to configure the verification system; and
transform the first data into a second data representative of a second design that includes:
a functionality of the first design; and
a first circuit generated by transformation to to compute a third data representative of a power consumption of a first portion of the first design when the hardware verification system is configured with the second data and run, wherein the first circuit is further adapted to be programmable without reconfiguring the second design, wherein the third data is received intermittently by a software module that accumulates the third data during a plurality of cycles of the hardware verification system.

15. The system of claim 14, wherein the first circuit is further adapted to be programmable to select the first portion when the hardware verification system is run.

16. The system of claim 14, wherein the first circuit is further programmable to:
select a second portion of the first design; and
compute a fourth data representative of a power consumption of the second portion of the first design when the hardware verification system is run.

17. The system of claim 14, wherein the first circuit is further adapted to transmit the third data when the third data is equal to or larger than a predetermined threshold.

18. The system of claim 14, wherein the first circuit is further adapted to compute the third data during one cycle of the hardware verification system.

19. The system of claim 14, wherein the first circuit is further adapted to:
identify a first number of transitions of a first signal of the first portion; and
multiply the first number by a fourth data indicative of a power consumption associated with the first signal to form a first weighted count when the hardware verification system is run.

20. The system of claim 19, wherein the first circuit is further adapted to:
identify a second number of transitions of a second signal of the first portion;
multiply the second number of transitions of the second signal by a fifth data indicative of a power consumption associated with the second signal to form a second weighted count; and
add the first weighted count and the second weighted count to determine the third data.

21. The system of claim 14, wherein the first circuit is further adapted to add a first value of the third data during one cycle of the hardware verification system and a second value of the third data during another cycle of the hardware verification system to form an accumulated third data.

22. The system of claim 21, wherein the first circuit is further adapted to transmit the accumulated third data when the accumulated third data is equal to or larger than a predetermined threshold.

23. The system of claim 14, wherein the second data further includes:

a second circuit adapted to compute a fourth data representative of a power consumption of a second portion of the first design different from the first portion; and
a third circuit adapted to compute a sum of the third data and the fourth data when the hardware verification system is run.

24. The system of claim 14, wherein the second data further includes:
a second circuit adapted to compute a fourth data representative of a power consumption of a second portion of the first design different from the first portion, the system being further adapted to:
program the first circuit and the second circuit to compute the third data and the fourth data such that a portion of the computation occurs during a same plurality of emulation cycles.

25. The system of claim 24, wherein the first portion and the second portion each include a first signal.

26. The system of claim 14, wherein the second data further includes:
a second circuit adapted to compute a fourth data representative of a power consumption of a second portion of the first design different from the first portion, the system being further adapted to:
programming the first circuit and the second circuit to compute the third data during a first plurality of emulation cycles and compute the fourth data during a second plurality of emulation cycles different from the first plurality of emulation cycles.

27. A computer-aided method for configuring a hardware verification system, the method comprising:
receiving, by the computer, a first data representative of a first design of an integrated circuit, when the computer is invoked to configure the verification system; and
transforming, using the computer, the first data into a second data representative of a second design that includes:
a functionality of the first design; and
a first circuit generated by transformation to to compute a third data representative of a power consumption of a first portion of the first design when the hardware verification system is configured with the second data and run, wherein the first circuit is programmable without reconfiguring the second design, wherein the first circuit transmits the third data when the third data is equal to or larger than a predetermined threshold.

28. The computer-aided method of claim 27, wherein the first circuit is programmable without reconfiguring the second design represented by the second data.

29. The computer-aided method of claim 27, wherein the first circuit is programmable to select the first portion when the hardware verification system is run.

30. The computer-aided method of claim 27, wherein the first circuit is programmable to:
select a second portion of the first design; and
compute a fourth data representative of a power consumption of the second portion of the first design when the hardware verification system is run.

31. The computer-aided method of claim 27, wherein the third data is received intermittently by a software module that accumulates the third data during a plurality of cycles of the hardware verification system.

32. The computer-aided method of claim 27, wherein the first circuit computes the third data during one cycle of the hardware verification system.

33. The computer-aided method of claim 27 further comprising:
  identifying, using the first circuit, a first number of transitions of a first signal of the first portion; and
  multiplying, using the first circuit, the first number by a fourth data indicative of a power consumption associated with the first signal to form a first weighted count when the hardware verification system is run.

34. The computer-aided method of claim 33 further comprising:
  identifying, using the first circuit, a second number of transitions of a second signal of the first portion;
  multiplying, using the first circuit, the second number of transitions of the second signal by a fifth data indicative of a power consumption associated with the second signal to form a second weighted count; and
  adding, using the first circuit, the first weighted count and the second weighted count to determine the third data.

35. The computer-aided method of claim 27 further comprising adding, using the first circuit, a first value of the third data during one cycle of the hardware verification system and a second value of the third data during another cycle of the hardware verification system to form an accumulated third data.

36. The computer-aided method of claim 35 further comprising transmitting, using the first circuit, the accumulated third data when the accumulated third data is equal to or larger than a predetermined threshold.

37. The computer-aided method of claim 27, wherein the second data further includes:
  a second circuit adapted to compute a fourth data representative of a power consumption of a second portion of the first design different from the first portion; and
  a third circuit adapted to compute a sum of the third data and the fourth data when the hardware verification system is run.

38. A system for configuring a hardware verification system, the system configured to:
  receive a first data representative of a first design of an integrated circuit, when the system is invoked to configure the verification system; and
  transform the first data into a second data representative of a second design that includes:
    a functionality of the first design; and
    a first circuit generated by transformation to to compute a third data representative of a power consumption of a first portion of the first design when the hardware verification system is configured with the second data and run, wherein the first circuit is programmable without reconfiguring the second design, wherein the first circuit transmits the third data when the third data is equal to or larger than a predetermined threshold.

39. The system of claim 38, wherein the first circuit is further adapted to be programmable without reconfiguring the second design represented by the second data.

40. The system of claim 38, wherein the first circuit is further adapted to be programmable to select the first portion when the hardware verification system is run.

41. The system of claim 38, wherein the first circuit is further programmable to:
  select a second portion of the first design; and
  compute a fourth data representative of a power consumption of the second portion of the first design when the hardware verification system is run.

42. The system of claim 38, wherein the third data is adapted to be received intermittently by a software module that accumulates the third data during a plurality of cycles of the hardware verification system.

43. The system of claim 38, wherein the first circuit is further adapted to compute the third data during one cycle of the hardware verification system.

44. The system of claim 38, wherein the first circuit is further adapted to:
  identify a first number of transitions of a first signal of the first portion; and
  multiply the first number by a fourth data indicative of a power consumption associated with the first signal to form a first weighted count when the hardware verification system is run.

45. The system of claim 44, wherein the first circuit is further adapted to:
  identify a second number of transitions of a second signal of the first portion;
  multiply the second number of transitions of the second signal by a fifth data indicative of a power consumption associated with the second signal to form a second weighted count; and
  add the first weighted count and the second weighted count to determine the third data.

46. The system of claim 38, wherein the first circuit is further adapted to add a first value of the third data during one cycle of the hardware verification system and a second value of the third data during another cycle of the hardware verification system to form an accumulated third data.

47. The system of claim 46, wherein the first circuit is further adapted to transmit the accumulated third data when the accumulated third data is equal to or larger than a predetermined threshold.

48. The system of claim 38, wherein the second data further includes:
  a second circuit adapted to compute a fourth data representative of a power consumption of a second portion of the first design different from the first portion; and
  a third circuit adapted to compute a sum of the third data and the fourth data when the hardware verification system is run.

* * * * *